US008992330B1

(12) United States Patent
Henrick et al.

(10) Patent No.: US 8,992,330 B1
(45) Date of Patent: *Mar. 31, 2015

(54) SYSTEM AND METHOD FOR FACILITATING DATA MODEL SUBSTITUTIONS FOR PRE-EXISTING DATA OBJECTS

(71) Applicant: Kabam, Inc., San Francisco, CA (US)

(72) Inventors: Clive Henrick, Castro Valley, CA (US); Benjamin Yee, San Francisco, CA (US); Benjamin Taller, Berkley, CA (US); Raymond Cook, Castro Valley, CA (US)

(73) Assignee: Kabam, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/021,129

(22) Filed: Sep. 9, 2013

Related U.S. Application Data

(63) Continuation of application No. 13/712,754, filed on Dec. 12, 2012, now Pat. No. 8,529,354.

(51) Int. Cl.
 *A63F 9/24* (2006.01)
(52) U.S. Cl.
 USPC .......................................................... 463/42
(58) Field of Classification Search
 USPC ...................... 463/31–43; 715/772
 See application file for complete search history.

(56) References Cited

U.S. PATENT DOCUMENTS

| 8,292,743 | B1* | 10/2012 | Etter et al. ...................... 463/42 |
| 8,313,364 | B2* | 11/2012 | Reynolds et al. ................. 463/9 |
| 8,388,451 | B2* | 3/2013 | Auterio et al. ................... 463/42 |
| 8,444,491 | B2* | 5/2013 | Bethke et al. ................... 463/42 |
| 8,448,080 | B2* | 5/2013 | Barber et al. ................. 715/772 |
| 8,454,441 | B2* | 6/2013 | Auterio et al. ................... 463/42 |
| 2009/0062007 | A1 | 3/2009 | Chihaya |
| 2011/0212783 | A1 | 9/2011 | Dale et al. |

* cited by examiner

*Primary Examiner* — Masud Ahmed
(74) *Attorney, Agent, or Firm* — Pillsbury Winthrop Shaw Pittman LLP

(57) ABSTRACT

The disclosure relates to systems and methods for facilitating data model substitution related to one or more pre-existing data objects in an expression of a game environment. A system may facilitate scalable addition of new game content by leveraging pre-existing data objects at a client computing platform. The system may include a game server that provides to the client computing platform data model substitutions for the existing data objects. The data model substitutions may be used to alter the behavior or function, look (e.g., visual appearance), description, and/or other characteristic of an expression of a pre-existing data object. Thus, by leveraging pre-existing data objects and providing such data model substitutions, new content or at least the appearance of new content from the user's perspective, may be provided without revising client code or requiring downloading new instructions that encode new data objects.

18 Claims, 4 Drawing Sheets

SYSTEM AND METHOD FOR FACILITATING DATA MODEL SUBSTITUTIONS FOR PRE-EXISTING DATA OBJECTS

RELATED APPLICATIONS

This application is a continuation of U.S. patent application Ser. No. 13/712,754, entitled "SYSTEM AND METHOD FOR FACILITATING DATA MODEL SUBSTITUTIONS FOR PRE-EXISTING DATA OBJECTS," and filed Dec. 12, 2012, which is hereby incorporated by reference into the present disclosure in its entirety.

FIELD OF THE INVENTION

The disclosure relates to systems and methods for facilitating data model substitution related to one or more pre-existing data objects in an expression of a game environment.

BACKGROUND OF THE INVENTION

Video games and other applications that display a virtual space for interaction typically require instructions to be downloaded onto a client computing platform with which a user interacts to play the video game. As the game is played (or the virtual space is otherwise interacted with), different game content such as levels, scenery, characters, items, and/or other game content may be displayed for interaction during gameplay. The game content may be displayed by expressing data objects at the client computing platform and/or instantiating data objects at a host server that hosts an online game for the client computing platform.

The data objects and logic that controls interactions with the data objects are typically predefined by the game application. Thus, the different game content is typically included in the game application. For example, an ADOBE FLASH file typically includes data objects for an expression of the game at a client computing device. The logic may control whether interactions with expressions of the data objects are possible and/or types of different interactions with expressions of the data objects that are possible.

Adding new game content and logic that controls such content typically requires the client computing platform to download additional instructions such as an add-on application (or a new version of the original application) because data objects and logic that controls them are predefined by the game application. For example, the ADOBE FLASH file would typically have to be updated with additional data objects for expressing the new game content. In games hosted by a game server, adding new content to the game may require the application at the game server to be updated with the additional instructions as well, requiring coordinated updates of instructions at the client and the server.

Adding new content to video games and other applications that present a virtual space for interaction is therefore inefficient for developers and results in an unsatisfying experience for users.

SUMMARY OF THE INVENTION

The disclosure relates to systems and methods for facilitating data model substitution related to one or more pre-existing data objects in an expression of a game environment. A system may facilitate scalable addition of new game content by leveraging pre-existing data objects at a client computing platform. The system may include a game server that provides to the client computing platform data model substitutions for the existing data objects.

The data model substitutions may be used to alter the behavior or function, look (e.g., visual appearance), description, and/or other characteristic of an expression of a pre-existing data object. Thus, by leveraging pre-existing data objects and providing such data model substitutions, new content or at least the appearance of new content from the user's perspective, may be provided without revising client code or requiring new instructions that encode new data objects to be downloaded.

The game server may include one or more processors configured to execute one or more modules such as a host module, a game module, a data model substitution module, and/or other modules.

The host module may be configured to host gameplay over a network such as the Internet in an interactive manner with one or more client computing platforms. For example, the host module may communicate with the one or more client computing platforms via a game module executing at the client computing platforms. The game module when executed at the client computing platform causes the client computing platform to generate an expression of the game.

The game module may be configured as a file having client-executable instructions such as an ADOBE FLASH script or other instructions. The game module may include one or more data objects that may be expressed at the client computing platform and logic for controlling interactions with the one or more data objects. Thus, the one or more data objects may be pre-existing at an expression of the game executing at the client computing platform.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

The disclosure relates to systems and methods for facilitating data model substitution related to one or more pre-existing data objects in an expression of a game environment. The pre-existing data objects when expressed may cause a visual representation of the expressed data objects to be displayed and/or interacted with during gameplay. A system may facilitate scalable addition of new game content by leveraging pre-existing data objects at a client computing platform. The system may include a game server that provides to the client computing platform data model substitutions for the existing data objects. For example, the game server may be configured to provide new logic that controls interactions with expressions of the existing data objects. The client computing platform may be configured to receive the updates and alter the behavior, visual appearance, and/or other characteristic of the existing data objects.

The system may also update the existing data objects with new visual information such as electronic artwork that changes a visual appearance of the expressions of the existing data objects and/or other information that is related to the expressions of the existing data objects. In this manner, new content may be added to the video game without additional downloads of new data objects and without updating the code executing at the client.

Figure 1:
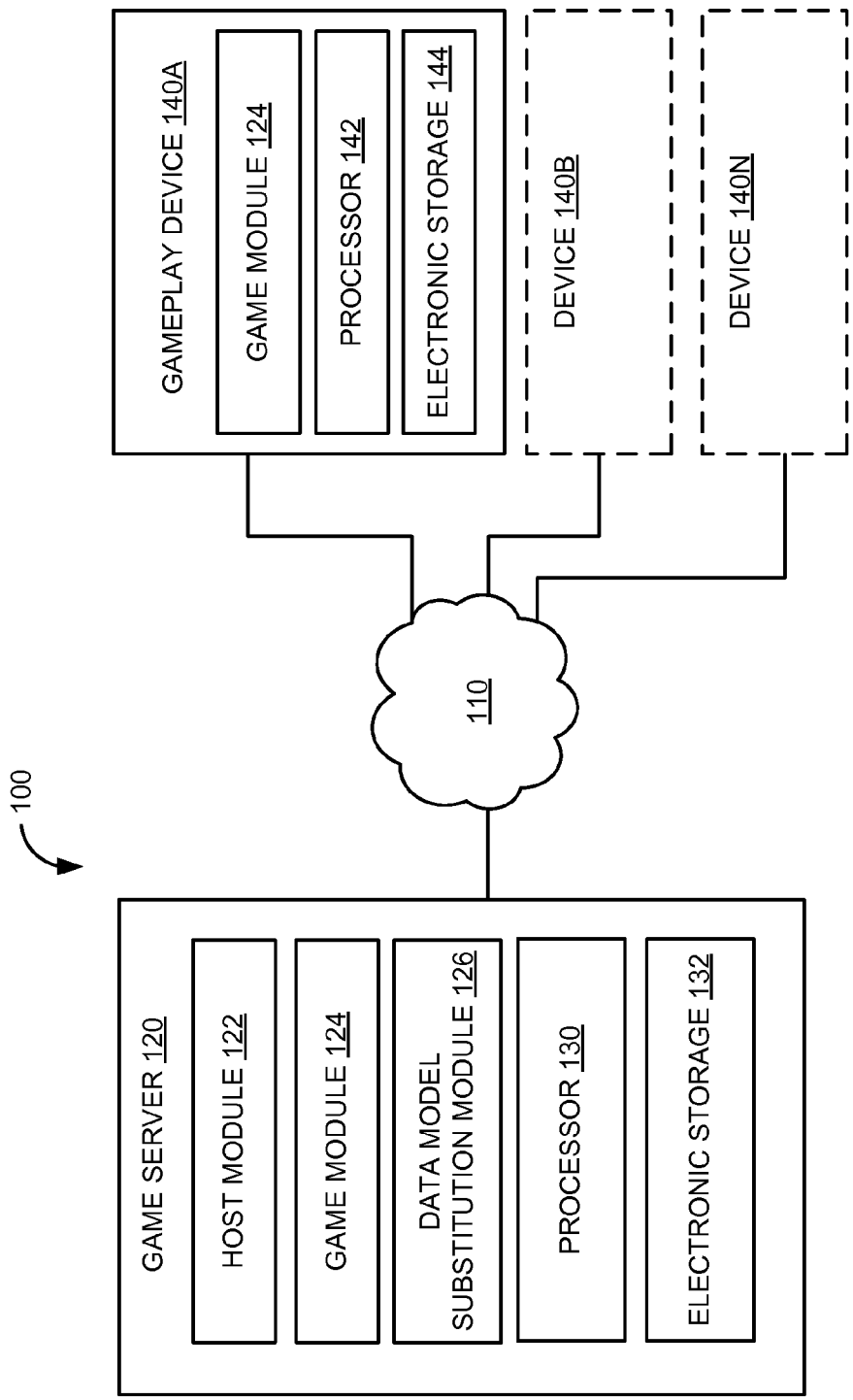
FIG. 1 illustrates a system of facilitating data model substitution related to one or more pre-existing data objects in an expression of a game environment, according to an embodiment of the invention.

FIG. 1 illustrates a system 100 of facilitating data model substitution related to one or more pre-existing data objects in an expression of a game environment. System 100 may include a game server 120, a client computing platform 140 (illustrated in FIG. 1 as client computing platforms 140A, 140B, . . . , 140N), and/or other components.

Game server 120 may include one or more processors 130 configured to execute one or more modules such as a host module 122, a game module 124, a data model substitution module 126, and/or other modules.

Host module 122 may be configured to host gameplay over network 110 such as the Internet in an interactive manner with one or more client computing platforms 140. In some embodiments, game server 120 may provide game module 124 for execution at client computing platform 140. Game module 124 when executed at the client computing platform 140 causes the client computing platform to generate an expression of the game. In hosted gameplay embodiments, game module 124 when executed at the client computing platform 140 causes the client computing platform to communicate with host module 122.

For example, host module 122 may communicate with the one or more client computing platforms via game module 124 executing at the client computing platforms 140. In particular, host module 122 may receive information related to gameplay from the client computing platforms 140. The information related to gameplay may include game inputs from a user, game status, game level, game events, and/or other information related to gameplay.

In some embodiments, game module 124 may include instructions that specify one or more data objects and logic that manages interactions with the one or more data objects. Thus, the expression of the game at client computing platform 140 includes one or more pre-existing data objects. In a particular example, the one or more data objects when expressed may be related to game content such as game scene a virtual city and the logic may manage interaction with the game content.

In a non-limiting example, game module 124 may be configured as an ADOBE FLASH file that executes via a plug-in installed at a browser of client computing platform. The ADOBE FLASH file includes instructions that when expressed causes a FLASH-based game to be playable at client computing platform 140.

Generally speaking, conventional ADOBE FLASH files include the data objects and logic for controlling the data objects for the FLASH-based game. Adding new game content to conventional ADOBE FLASH files require updating the code of such files. Conventional ADOBE FLASH clients maintain their state with respect to data objects because conventional ADOBE FLASH files include the data objects and logic necessary for the expression of the data objects. The systems and methods disclosed herein allows for the pre-existing data objects and logic to be updated such that new scenes and logic may be added to the expression of the FLASH-based game without developing new instructions or code into the ADOBE FLASH file.

In some embodiments, data model substitution module 126 may be configured to add new game content based on one or more data model substitutions. In some embodiments, data model substitution module 126 may be configured to communicate the data model substitutions to game module 124 such that expressions of pre-existing data objects are updated with the data model substitutions and/or new expressions are created such that new game content is added (e.g., from the perspective of the user). In this manner, new game content may be added by updating pre-existing data objects rather than communicating different, new, data objects.

Game module 124 may be configured to apply the data model substitutions to the pre-existing data objects in order to present new game content. Thus, game module 124 need not be re-coded to account for the new game content. Instead, unlike conventional systems (such as conventional FLASH clients), game module 124 may update pre-existing data objects based on data model substitutions from game server 120. In this manner, game module 124 may express pre-existing data objects differently (thereby providing new game content) based on the data model substitutions without maintaining state with respect to the data objects. For example, unlike conventional systems, game module 124 may be stateless with respect to the data objects.

In some embodiments, the data model substitutions may include logic that controls the behavior of the pre-existing data objects when the objects are expressed, appearance information such as electronic artwork that affects a visual appearance one or more graphical objects associated with the pre-existing data objects, description information that describes or otherwise is related to the pre-existing data objects, and/or other data model substitutions.

In some embodiments, the data model substitutions may recur during the course of gameplay such that multiple data model substitutions may occur during gameplay. For example, data model substitution module 126 may, at various times, obtain and communicate the data model substitutions during gameplay at a client computing platform.

In some embodiments, data model substitution module 126 may be configured to receive an indication of an event related to gameplay during the particular expression of the game environment. For example, in hosted embodiments, host module 122 may communicate with game module 124 executing at client computer platform 140 and receive such indications, which may be obtained by data model substitution module 126. The event may include a user input, a switching of a game level, a navigation event (e.g., movement from one virtual city to another virtual city), and/or other event. In some embodiments, data model substitution module 126 may obtain and communicate a data model substitution based on the indication of the event.

For example, when data model substitution module 126 receives an indication that a second virtual city should be navigated to from a first virtual city, one or more data model substitutions related to changing from the second virtual city from the first virtual city may be obtained and communicated. In this manner, the client (more specifically, the instructions such as an ADOBE FLASH file) need not be encoded with the particular instructions to render the second virtual city. In this manner, virtual cities and/or other game content may be added in a scalable manner that otherwise would have to be encoded into the client instructions.

In some embodiments, the pre-existing data objects may include one or more sub-objects. For example, a pre-existing data object that when expressed causes a virtual city to be displayed and/or interacted with may include one or more sub-objects such as various virtual items within the virtual city. The virtual items may include, for example, virtual building, virtual vehicles, virtual characters, and/or other virtual items. The sub-objects may be subject to (e.g., controlled by) logic that controls the behavior of the virtual items. Such logic may include, for example, whether the items may be interacted with, the types of interactions that are possible, and/or other logic.

In some embodiments, the data model substitutions related to the pre-existing objects and/or other data module substitutions may update the one or more sub-objects. For example, the logic that manages the sub-objects, the appearance information related to the one or more sub-objects, the description information related to the one or more sub-objects, and/or other data model substitutions may be made in relation to the one or more sub-objects. Sub-objects may themselves include other sub-objects, which may be similarly updated with data model substitutions.

Client computing platform 140 may include one or more processors 142 configured to execute one or more modules such as a game module 124 and/or other modules. Client computing platform 140 may receive data model substitutions from game server 120 and/or an intermediate device. In some embodiments, client computing platform 140 may obtain game module 124 from game server 120.

Client computing platform 140 may be configured to execute game module 124. Game module 124 may be configured to receive the one or more data model substitutions and update game content based on the data model substitutions.

In some embodiments, game module 124 may be configured to express one or more pre-existing data objects in a particular expression of a game environment expressed at the client computing platform. The one or more pre-existing data objects may be subject to logic that controls behavior of the one or more pre-existing data objects.

In some embodiments, game module 124 may receive first logic for the one or more pre-existing data objects. The first logic may cause a first behavior of the expression of the one or more pre-existing data objects during gameplay via the particular expression of the game environment. The logic may specify whether and how different interactions with an expression of the pre-existing data objects are possible.

Game module 124 may cause the first behavior of the expression of the one or more pre-existing data objects during the gameplay via the particular expression of the game environment based on the received first logic.

Game module 124 may receive second logic different than the first logic for the one or more pre-existing data objects. The second logic causes a second behavior of the expression of the one or more pre-existing data objects during gameplay via the particular expression of the game environment.

Game module 124 may cause the second behavior of the expression of the one or more pre-existing data objects during the gameplay via the particular expression of the game environment. In this manner, the behavior of the expression of the one or more pre-existing data objects may be updated based on the data model substitutions from game server 120.

In some embodiments, game module 124 may be configured to receive first appearance information for the one or more pre-existing data objects. The first appearance information causes a first appearance (e.g., a visual appearance having particular visual characteristics) of the expression of the one or more pre-existing data objects during gameplay. In some embodiments, the game module may cause the display one or more graphical objects to have the first appearance during gameplay. The one or more graphical objects may be related to the expression of the one or more pre-existing data objects.

In some embodiments, game module 124 may be configured to receive second appearance information different from the first appearance information for the one or more pre-existing data objects. The second appearance information may cause a second appearance of the expression of the one or more pre-existing data objects during gameplay via the particular expression of the game environment. Game module 124 may alter the display of the one or more graphical objects to have the second appearance during gameplay. For example, the appearance of graphical objects related to the one or more pre-existing data objects may be altered based on different appearance information that is received. In this manner, the data model substitutions may be used to update the appearance of graphical objects, giving the appearance of new (or different) graphical objects being added for gameplay.

In some embodiments, game module 124 may be configured to receive first description information related to the one or more pre-existing data objects. The first description information causes a first description related to the expression of the one or more pre-existing data objects to be displayed or used during gameplay via the particular expression of the game environment. For example, the first description may relate to a description (e.g., name) of a pre-existing data object that when expressed causes a virtual city to be rendered, a characteristic of virtual items such as a name or floorplan of a virtual building in the virtual city, and/or other description. Game module 124 may display or use the first description information during gameplay. For example, the first description may be used when rendering the one or more pre-existing data objects.

Game module 124 may receive second description information different from the first description information related to the one or more pre-existing data objects. The second description information causes a second description related to the expression of the one or more pre-existing data objects to be displayed or used during gameplay via the particular expression of the game environment. Game module 124 may display or use the second description information during gameplay. In this manner, a description of an expressed pre-existing data object may be updated via one or more data model substitutions.

In some embodiments, game module 124 may obtain one or more events related to gameplay. For example, game module 124 may receive a navigation event during gameplay. The navigation event may include nan input during the gameplay that indicates a navigation from a first virtual location to a second virtual location. Game module 124 may communicate the navigation event to the game server. The game server may, in turn, cause one or more data model substitutions to be communicated based on the event.

Network 110 may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

Those having skill in the art will recognize that game server 120 and gaming device 140 may each comprise one or more processors (130, 142), one or more interfaces (to various peripheral devices or components), electronic storage media (132, 144), and/or other components coupled via a bus. The electronic storage media may comprise random access memory (RAM), read only memory (ROM), or other memory. The memory may store computer-executable instructions to be executed by the processor as well as data that may be manipulated by the processor. The storage media may comprise floppy disks, hard disks, optical disks, tapes, or other storage media for storing computer-executable instructions and/or data.

Figure 2:
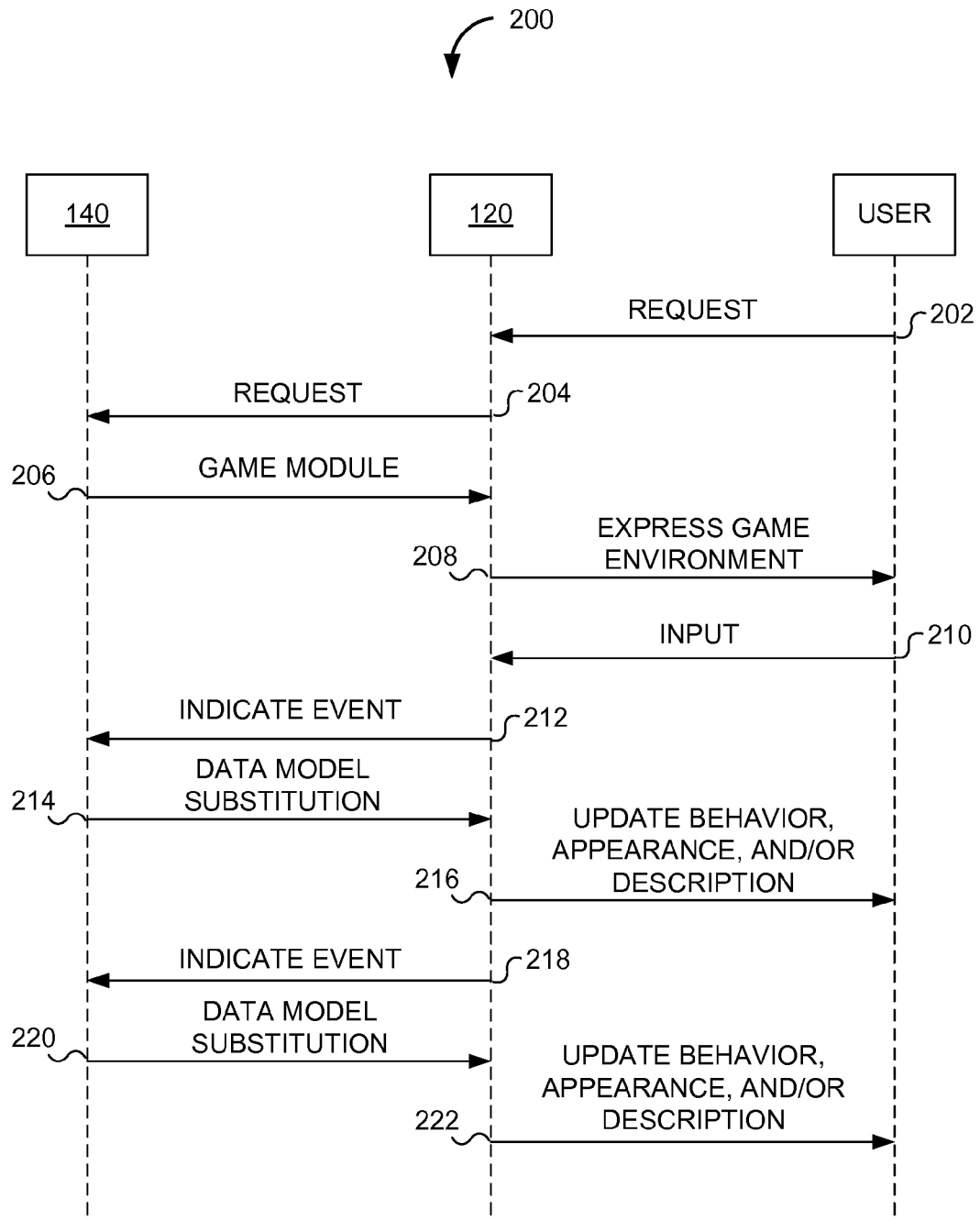
FIG. 2 illustrates a data flow diagram of data model substitution related to one or more pre-existing data objects in an expression of a game environment, according to an embodiment of the invention.

FIG. 2 illustrates a data flow diagram 200 for data model substitutions related to one or more pre-existing data objects, according to an embodiment. In an operation 202, client computing platform 120 may receive a request to play a game from a user operating the client computing platform. For example, the user may select from among one or more online or other games to be played.

In an operation 204, the request may be communicated from client computing platform 120 and game server 140 may receive the request. In an operation 206, game server 140 may identify a corresponding game module and communicate the game module to client computing platform 120. The game module may include an ADOBE FLASH file or other instructions for expressing a game environment.

In an operation 208, client computing platform 120 may express the game environment based on the game module, which may include one or more pre-existing data objects encoded by the game module. A logic, appearance, description, and/or other information related to the pre-existing data objects may be included with the game module such that the expression of the game environment includes gameplay functionality.

In an operation 210, client computing platform 120 may receive a game input from the user. For example, the game input may include a navigation, an interaction with an expression of the one or more pre-existing data objects, and/or other input. In an operation 212, client computing platform 120 may communicate and game server 140 may receive a game event. The game event may be based on the game input and/or other process occurring in the expression of the game environment at the client computing platform.

In an operation 214, game server 120 may obtain first logic and communicate the first logic to client computing platform 140. The obtained first logic may be based on the game event. For example, the game event may indicate that a particular virtual city was navigated to (or otherwise should be displayed in relation to the expression of the game environment). Game server 120 may identify particular logic that should be used for the particular virtual city. In some embodiments, game server 120 may obtain and communicate first appearance information that causes a particular visual appearance of expressions of the pre-existing data objects to be displayed. In some embodiments, game server 120 may obtain and communicate first description information that describes expressions of the pre-existing data objects.

In an operation 216, client computing platform 140 may cause the behavior, appearance, description, and/or other characteristic of expressions of the one or more pre-existing data objects to be changed based on the first logic, the first appearance information, the first description information, and/or other information. For example, client computing platform 120 may generate new and/or updated expressions of the one or more pre-existing data objects based on the first logic, the first appearance information, the first description information, and/or other information.

In an operation 218, client computing platform 120 may communicate and game server 140 may receive a second game event. The second game event may be based on the game input and/or other process occurring in the expression of the game environment at client computing platform 140.

In an operation 220, game server 120 may obtain second logic and communicate the second logic to client computing platform 140. The obtained second logic may be based on the game event. In some embodiments, game server 120 may obtain and communicate second appearance information that causes a particular visual appearance of expressions of the pre-existing data objects to be displayed. In some embodiments, game server 120 may obtain and communicate second description information that describes expressions of the pre-existing data objects.

In an operation 222, client computing platform 140 may cause the behavior, appearance, description, and/or other characteristic of expressions of the one or more pre-existing data objects to be changed based on the second logic, the second appearance information, the second description information, and/or other information.

Figure 3:
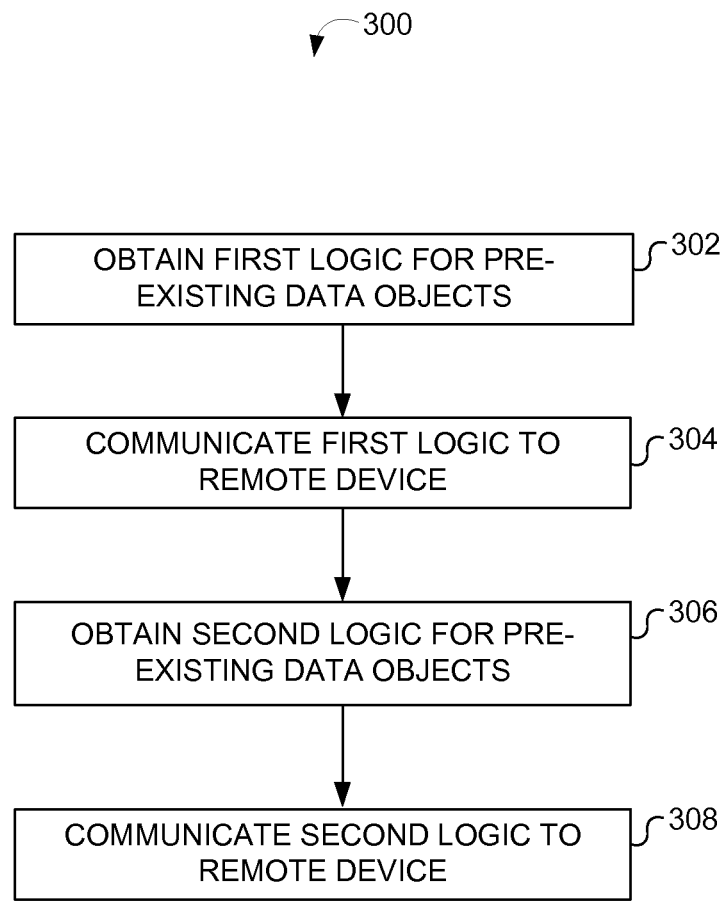
FIG. 3 illustrates a process for facilitating data model substitution related to one or more pre-existing data objects in an expression of a game environment, according to an embodiment of the invention.

FIG. 3 illustrates a process 300 for data model substitutions related to one or more pre-existing data objects, according to an embodiment. The various processing operations and/or data flows depicted in FIG. 3 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 302, first logic for the one or more pre-existing data objects may be obtained. The first logic may cause a first behavior of an expression of the one or more pre-existing data objects during gameplay via an particular expression of the game environment. In some embodiments, first appearance information that includes a visual appearance of the expression of the one or more pre-existing data objects in the expressed game environment, first description information that describes the expression of the one or more pre-existing data objects, and/or other information related to the pre-existing data objects may be obtained.

In an operation 304, the first logic may be caused to be communicated to a remote device (e.g., client computing platform 140) such that the first behavior of the expression of the one or more pre-existing data objects is caused during the gameplay via the particular expression of the game environment. In some embodiments, appearance information, description information, and/or other information related to the pre-existing data objects may be communicated.

In an operation 306, second logic different than the first logic may be obtained for the one or more pre-existing data objects. For example, the second logic may be received from the remote device. The second logic causes a second behavior of the expression of the one or more pre-existing data objects during gameplay via the particular expression of the game environment.

In an operation 308, the second logic may be caused to be communicated to the remote device such that the second behavior of the expression of the one or more pre-existing data objects is caused during the gameplay via the particular expression of the game environment.

Figure 4:
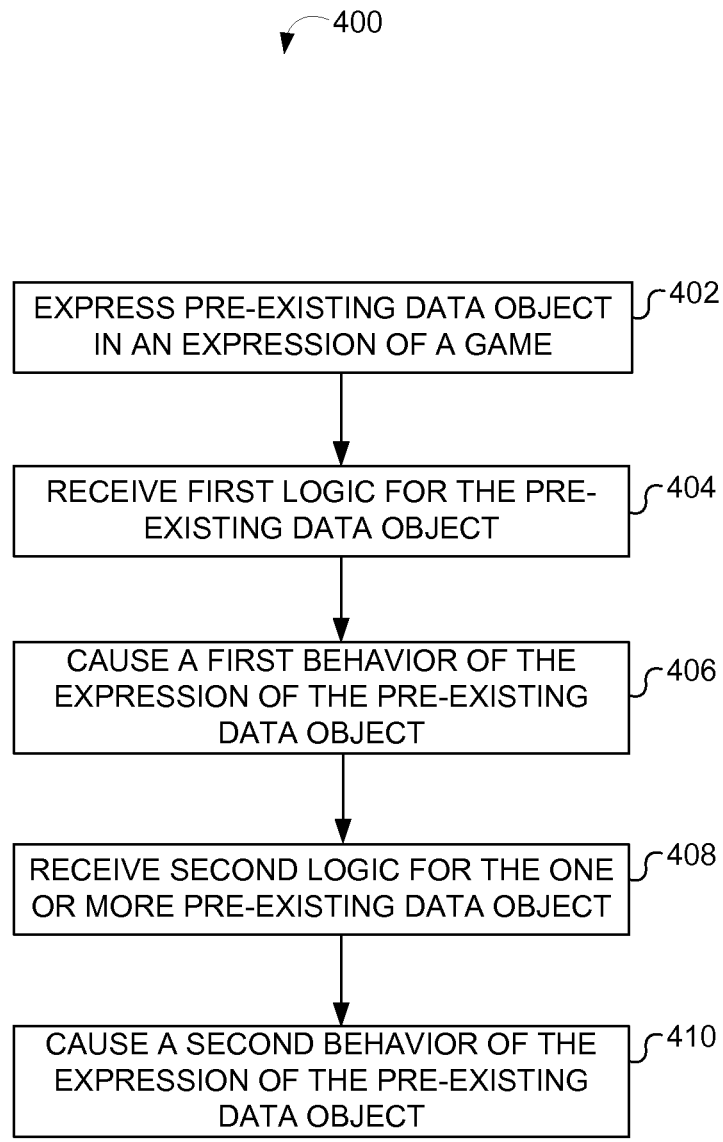
FIG. 4 illustrates a process for facilitating data model substitution related to one or more pre-existing data objects in an expression of a game environment, according to an embodiment of the invention.

FIG. 4 illustrates a process 400 for data model substitutions related to one or more pre-existing data objects, according to an embodiment. In an operation 402, one or more pre-existing data objects in a particular expression of a game environment expressed at the device may be expressed. The one or more pre-existing data objects may be subject to logic that controls behavior of the one or more pre-existing data objects.

In an operation 404, first logic for the one or more pre-existing data objects may be received. The first logic may cause a first behavior of the expression of the one or more pre-existing data objects during gameplay via the particular expression of the game environment.

In an operation 406, the first behavior of the expression of the one or more pre-existing data objects during the gameplay via the particular expression of the game environment may be caused.

In an operation 408, second logic different than the first logic for the one or more pre-existing data objects may be received. The second logic may cause a second behavior of the expression of the one or more pre-existing data objects during gameplay via the particular expression of the game environment.

In an operation 410, the second behavior of the expression of the one or more pre-existing data objects the gameplay via the particular expression of the game environment may be caused.

Although described with respect to video games, the disclosure may be used in other contexts in which a virtual environment may be expressed at a client computing platform. Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system configured to facilitate data model substitution related to one or more pre-existing data objects in an expression of a game environment, the system comprising:
   one or more electronic storage media configured to store one or more pre-existing data objects to be expressed in a particular expression of a game environment at a remote device, the one or more pre-existing data objects being subject to logic that controls behavior of the one or more pre-existing data objects;
   one or more processors configured to execute computer program modules, the computer program modules comprising:
   a data model substitution module configured to:
      obtain first logic for the one or more pre-existing data objects, wherein the first logic causes a first behavior of an expression of the one or more pre-existing data objects during gameplay via the particular expression of the game environment; and,
      cause the first logic to be communicated to the remote device such that the first behavior of the expression of the one or more pre-existing data objects is caused during the gameplay via the particular expression of the game environment.

2. The system of claim 1, wherein the data model substitution module is further configured to:
   obtain first appearance information for the one or more pre-existing data objects, wherein the first appearance information causes a first appearance of the expression of the one or more pre-existing data objects during gameplay via the particular expression of the game environment;
   cause the first appearance information to be communicated to the remote device such that the first appearance of the expression of the one or more pre-existing data objects is caused during the gameplay via the particular expression of the game environment.

3. The system of claim 1, wherein the data model substitution module is further configured to:
   obtain first description information related to the one or more pre-existing data objects, wherein the first description information causes a first description related to the expression of the one or more pre-existing data objects to be displayed or used during gameplay via the particular expression of the game environment;
   cause the first description information to be communicated to the remote device such that the first description is displayed or used during the gameplay via the particular expression of the game environment.

4. The system of claim 1, wherein the one or more pre-existing data objects comprise one or more sub-objects that are subject to the first logic.

5. The system of claim 1, wherein the one or more pre-existing data objects comprise a city object that when expressed causes a virtual city to be implemented at the particular expression of the game environment.

6. The system of claim 5, wherein the one or more pre-existing data objects comprise one or more sub-objects that are subject to the first logic, the one or more sub-objects when expressed in the particular expression of the game environment comprise one or more virtual buildings in the first virtual city.

7. The system of claim 1, wherein the first logic is stateless from the perspective of the remote device.

8. A computer-implemented method of facilitating data model substitution related to one or more pre-existing data objects in an expression of a game environment, the method being implemented in a computer that includes one or more processors configured to execute computer program modules, the method comprising:
   obtaining, by a data model substitution module, first logic for the one or more pre-existing data objects, wherein the first logic causes a first behavior of an expression of the one or more pre-existing data objects during gameplay via the particular expression of the game environment; and,
   causing, by the data model substitution module, the first logic to be communicated to the remote device such that the first behavior of the expression of the one or more pre-existing data objects is caused during the gameplay via the particular expression of the game environment.

9. The method of claim 8, the method further comprising:
   obtaining, by the data model substitution module, first appearance information for the one or more pre-existing data objects, wherein the first appearance information causes a first appearance of the expression of the one or more pre-existing data objects during gameplay via the particular expression of the game environment;
   causing, by the data model substitution module, the first appearance information to be communicated to the remote device such that the first appearance of the expression of the one or more pre-existing data objects is caused during the gameplay via the particular expression of the game environment.

10. The method of claim 8, the method further comprising:
obtaining, by the data model substitution module, first description information related to the one or more pre-existing data objects, wherein the first description information causes a first description related to the expression of the one or more pre-existing data objects to be displayed or used during gameplay via the particular expression of the game environment;
causing, by the data model substitution module, the first description information to be communicated to the remote device such that the first description is displayed or used during the gameplay via the particular expression of the game environment.

11. The method of claim 8, wherein the one or more pre-existing data objects comprise one or more sub-objects that are subject to the first logic.

12. The method of claim 8, wherein the one or more pre-existing data objects comprise a city object that when expressed causes a virtual city to be implemented at the particular expression of the game environment.

13. The method of claim 12, wherein the one or more pre-existing data objects comprise one or more sub-objects that are subject to the first logic, the one or more sub-objects when expressed in the particular expression of the game environment comprise one or more virtual buildings in the first virtual city.

14. The method of claim 8, wherein the first logic is stateless from the perspective of the remote device.

15. A device configured to perform data model substitution related to one or more pre-existing data objects in an expression of a game environment expressed at the device, the device comprising:
one or more electronic storage media configured to store one or more pre-existing data objects to be expressed in a particular expression of a game environment at a remote device, the one or more pre-existing data objects being subject to logic that controls behavior of the one or more pre-existing data objects;
one or more processors configured to execute computer program modules, the computer program modules comprising:
a game module configured to:

express one or more pre-existing data objects in a particular expression of a game environment expressed at the device, the one or more pre-existing data objects being subject to logic that controls behavior of the one or more pre-existing data objects;
receive, from a game server, first logic for the one or more pre-existing data objects, wherein the first logic causes a first behavior of the expression of the one or more pre-existing data objects during gameplay via the particular expression of the game environment; and,
cause the first behavior of the expression of the one or more pre-existing data objects during the gameplay via the particular expression of the game environment.

16. The device of claim 15, wherein the game module is further configured to:
receive, from the game server, first appearance information for the one or more pre-existing data objects, wherein the first appearance information causes a first appearance of the expression of the one or more pre-existing data objects during gameplay via the particular expression of the game environment; and,
display one or more graphical objects having the first appearance during the gameplay via the particular expression of the game environment, wherein the one or more graphical objects are related to the expression of the one or more pre-existing data objects.

17. The device of claim 15, wherein the game module is further configured to:
receive, from the game server, first description information related to the one or more pre-existing data objects, wherein the first description information causes a first description related to the expression of the one or more pre-existing data objects to be displayed or used during gameplay via the particular expression of the game environment; and,
display or use the first description information during the gameplay via the particular expression of the game environment.

18. The device of claim 15, wherein the first logic and is stateless.

* * * * *